US010970222B2

(12) United States Patent
Bavishi et al.

(10) Patent No.: US 10,970,222 B2
(45) Date of Patent: Apr. 6, 2021

(54) EVICTION OF A CACHE LINE BASED ON A MODIFICATION OF A SECTOR OF THE CACHE LINE

(71) Applicant: Micron Technology, Inc., Boise, ID (US)

(72) Inventors: Dhawal Bavishi, San Jose, CA (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/289,510

(22) Filed: Feb. 28, 2019

(65) Prior Publication Data

US 2020/0278931 A1 Sep. 3, 2020

(51) Int. Cl.
*G06F 12/0891* (2016.01)
(52) U.S. Cl.
CPC .. *G06F 12/0891* (2013.01); *G06F 2212/1032* (2013.01)
(58) Field of Classification Search
CPC ............... G06F 12/0891; G06F 2212/1032
See application file for complete search history.

(56) References Cited

U.S. PATENT DOCUMENTS

| 5,671,444 | A | 9/1997 | Akkary et al. |
| 6,378,047 | B1* | 4/2002 | Meyer ............... G06F 12/0804 |
| | | | 711/135 |
| 7,493,450 | B2* | 2/2009 | Bearden ............ G06F 12/0862 |
| | | | 711/113 |
| 9,639,466 | B2 | 5/2017 | Robertson et al. |
| 10,387,329 | B2 | 8/2019 | Chang |
| 2003/0093636 | A1 | 5/2003 | Henry et al. |
| 2004/0054853 | A1 | 3/2004 | Sprangle et al. |
| 2004/0128452 | A1 | 7/2004 | Schmisseur et al. |
| 2004/0205296 | A1 | 10/2004 | Bearden |
| 2005/0044317 | A1 | 2/2005 | Rivers |
| 2005/0268051 | A1 | 12/2005 | Hill et al. |

(Continued)

FOREIGN PATENT DOCUMENTS

KR 10-2014-000733 A 1/2014
KR 10-2015-0079429 A 7/2015

(Continued)

OTHER PUBLICATIONS

International Search Report and Written Opinion for International Application No. PCT/US2020/01991, dated Jun. 19, 2020, 11 pages.

(Continued)

*Primary Examiner* — Francisco A Grullon
(74) *Attorney, Agent, or Firm* — Lowenstein Sandler LLP

(57) ABSTRACT

An indication to perform an eviction operation on a cache line in a cache can be received. A determination can be made as to whether at least one sector of the cache line is associated with invalid data. In response to determining that at least one sector of the cache line is associated with invalid data, a read operation can be performed to retrieve valid data associated with the at least one sector. The at least one sector of the cache line that is associated with the invalid data can be modified based on the valid data. Furthermore, the eviction operation can be performed on the cache line with the modified at least one sector.

20 Claims, 5 Drawing Sheets

(56) References Cited

U.S. PATENT DOCUMENTS

| | | |
|---|---|---|
| 2006/0218352 A1 | 9/2006 | Shannon et al. |
| 2007/0067572 A1 | 3/2007 | Jiao et al. |
| 2007/0174599 A1 | 7/2007 | Dowling |
| 2008/0022045 A1 | 1/2008 | Ali et al. |
| 2011/0225369 A1 | 9/2011 | Park et al. |
| 2013/0111136 A1 | 5/2013 | Bell, Jr. et al. |
| 2014/0040552 A1 | 2/2014 | Rychlik et al. |
| 2015/0012705 A1 | 1/2015 | Holmqvist et al. |
| 2015/0026404 A1 | 1/2015 | Lilly et al. |
| 2015/0046649 A1 | 2/2015 | Benhase et al. |
| 2015/0309933 A1* | 10/2015 | Nellans ............... G06F 12/0804 711/103 |
| 2016/0041773 A1 | 2/2016 | Phan |
| 2016/0062651 A1 | 3/2016 | Hineman et al. |
| 2017/0235681 A1* | 8/2017 | Kaburaki ............ G06F 12/0292 711/128 |
| 2018/0095756 A1 | 4/2018 | Hasenplaugh et al. |
| 2018/0121360 A1 | 5/2018 | Chen |
| 2019/0004967 A1 | 1/2019 | Chachad et al. |

FOREIGN PATENT DOCUMENTS

| | | |
|---|---|---|
| KR | 10-2017-0138765 A | 12/2017 |
| KR | 10-2018-0078253 A | 7/2018 |

OTHER PUBLICATIONS

International Search Report and Written Opinion for International Application No. PCT/US2020/020211, dated Jun. 23, 2020, 11 pages.

International Search Report and Written Opinion for International Application No. PCT/US2020/020289, dated Jun. 23, 2020, 11 pages.

International Search Report and Written Opinion for International Application No. PCT/US2020/020294, dated Jun. 26, 2020, 11 pages.

\* cited by examiner

EVICTION OF A CACHE LINE BASED ON A MODIFICATION OF A SECTOR OF THE CACHE LINE

TECHNICAL FIELD

The present disclosure generally relates to a memory sub-system, and more specifically, relates to the eviction of a cache line based on a modification of a sector of the cache line at a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
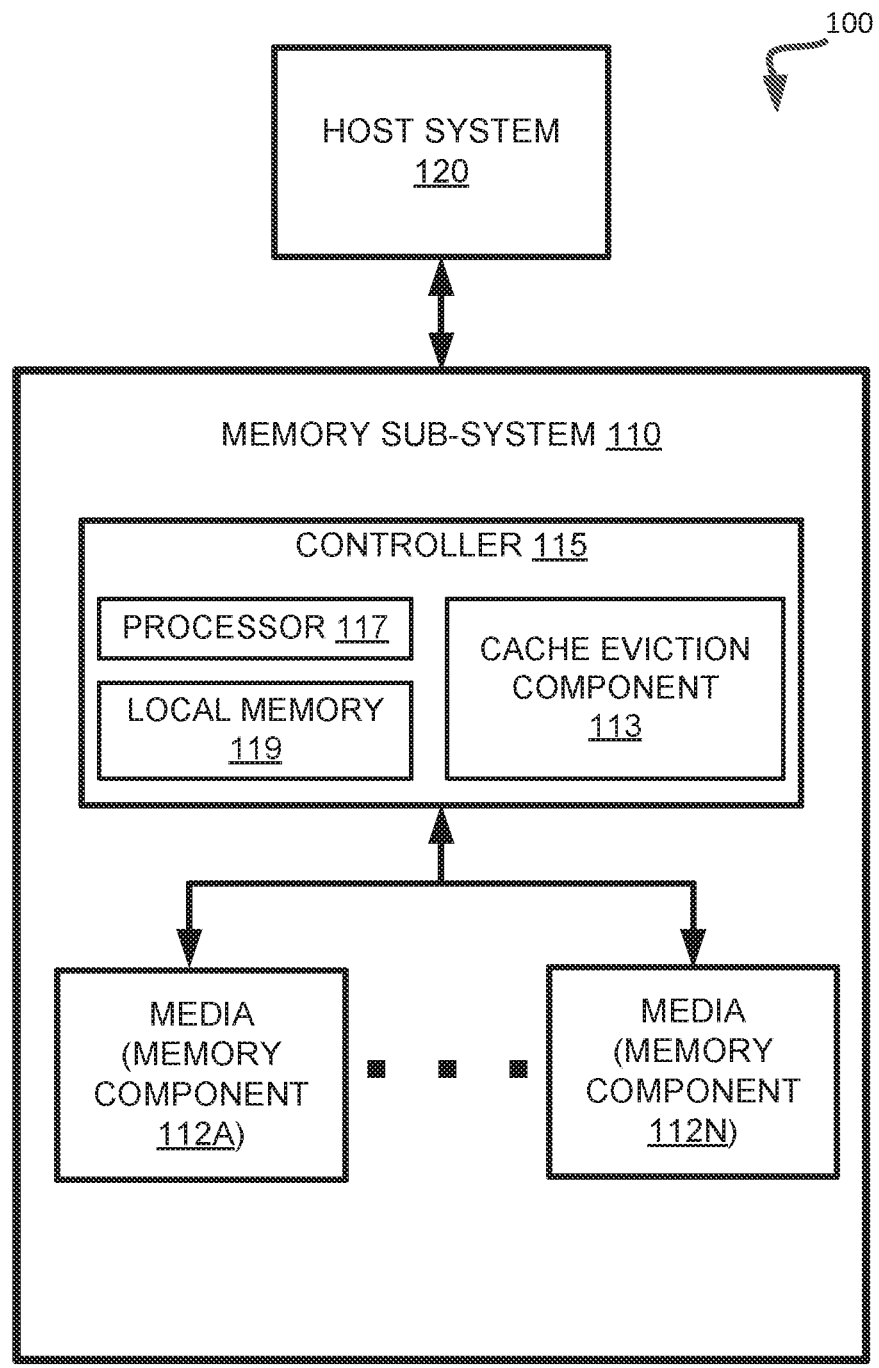
FIG. 1 illustrates an example computing environment that includes a memory sub-system in accordance with some embodiments of the present disclosure.

Aspects of the present disclosure are directed to the eviction of a cache line based on a modification of a sector of the cache line at a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A conventional memory sub-system can utilize a cache to improve the performance of the memory sub-system. The cache can be a type of memory where data can be retrieved in less time than when data is to be retrieved from a backing store (e.g., one or more of the memory components) of the memory sub-system. The cache can store data from the backing store that has recently been read or written by the host system. For example, the cache can store data that has recently been written to a memory component or data that has recently been read from a memory component.

The cache can store multiple cache lines where each cache line includes a group of data organized into sectors. For example, each sector may include data that is associated with a read operation or a write operation from the host system. In some embodiments, the data from read operations or write operations from the host system can be separated into multiple sectors based on a management unit size utilized by the memory components of the memory sub-system. Each memory component of the memory sub-system can be associated with a protocol that specifies the size of the management unit used by the memory component. The host system can initially request to read 512 KB of data from the memory component, but the 512 KB request can be separated into smaller granularity requests (e.g., eight 64 KB read requests) due to the protocol of the memory component. The conventional memory sub-system can perform the smaller granularity requests to obtain the data from the memory components, which can then be stored in the cache and/or returned to the host system. Thus, each cache line of the cache can include data for multiple sectors that correspond to read operations or write operations of the host system.

In a conventional memory sub-system, cache lines can be evicted from the cache. For example, when a threshold amount of cache lines are stored at the cache, a particular cache line can be removed (i.e., evicted) from the cache and the corresponding data of the sectors in the cache line can be stored at the backing store (e.g., the one or more memory components) of the memory sub-system. Over time, the host system can invalidate the data at a particular sector (e.g., provide new data that is to replace the data of the sector or erase the data). However, if the cache line includes the invalid data, then when the cache line is evicted from the cache, the invalid data can be stored at the backing store along with the valid data from the remaining sectors of the cache line. Such storing of the invalid data as a result of the eviction operation can cause inconsistencies in the data that has been stored at the memory sub-system.

Aspects of the present disclosure address the above and other deficiencies by evicting a cache line based on a modification of a sector of the cache line at the memory sub-system. For example, as previously described, a cache line can include multiple sectors of data. A determination can be made as to whether any of the sectors of the cache line includes invalid data. In some embodiments, a content addressable memory (CAM) or other such indication can be used to determine whether a sector of the cache line includes invalid data. If the cache line does include a sector with invalid data, then the memory sub-system can perform a read-modify-write operation to modify the sector with the invalid data (i.e., the invalid sector) with valid data. For example, the valid data can be retrieved or read from the backing store and the retrieved valid data can be written to the invalid sector of the cache line. Subsequently, the cache line with the retrieved valid data can then be evicted and the data at each sector of the cache line can be stored or written at the backing store of the memory sub-system. Thus, the replacement of the invalid data with the valid data by using the read-modify-write operation can be performed before the cache line is evicted from the cache.

In some embodiments, the memory sub-system can include multiple caches. For example, a first cache can be a write-read cache that is used to store data of read operations and write operations from the host system when the workload of the host system is random. For example, the workload of the host system can be considered random when a combination of read operations and write operations are issued by the host system. A second cache can be a read-only cache that is used to store data of read operations from the host system when the workload of the host system is based on a sequential number of read operations (i.e., no write operations). For example, the read-only cache can include data from the backing store that have been retrieved in response to read operations from the host system. In some embodiments, the cache line that is to be evicted from the write-read cache can include an invalid sector while the read-only cache can include a corresponding valid sector. For example, the host system can provide new data that is to replace the invalid data and the new data can be stored at a sector of another cache line of the read-only cache. In such cases, the read-modify-write operation can be performed to retrieve the valid data from the read-only cache and replace the invalid data at the write-read cache with the retrieved valid data. Thus, the valid data can be retrieved from the read-only cache instead of the backing store when the valid data is available at the read-only cache. Since the valid data can be retrieved in less time from the read-only cache than retrieving the valid data from the backing store, the read-modify-write operation can also be performed in less time, thus improving the performance of the memory sub-system as cache lines are evicted from the write-read cache.

Advantages of the present disclosure include, but are not limited to, an improvement to the data consistency of the memory sub-system. For example, as cache lines are evicted from the write-read cache, the invalid data can be replaced with valid data. As a result, the invalid data is not stored at the backing store of the memory sub-system when cache lines are evicted from the write-read cache. Thus, the performance of the memory sub-system can be improved as the separate write-read cache can be utilized when the host system is associated with a random workload and the data consistency is maintained by the replacing of any invalid data at a sector of a cache line when the cache line is to be evicted from the write-read cache and the data of the evicted cache line is stored at the backing store of the memory sub-system.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a cache eviction component 113 that can be used to perform an eviction operation for a cache of the memory sub-system 110. In some embodiments, the controller 115 includes at least a portion of the cache eviction component 113. For example, the controller 115 can include a processor 117 (processing device) configured to execute instructions stored in local memory 119 for performing the operations described herein. In some embodiments, the cache eviction component 113 is part of the host system 120, an application, or an operating system.

The cache eviction component 113 can receive an indication to perform an eviction operation on a cache line in a cache. In response to the indication to perform the eviction operation, the cache eviction component 113 can determine whether any sectors of the cache line include invalid data. If a sector does include invalid data, then the cache evident component 113 can retrieve corresponding valid data from the backing store (e.g., the memory components 112A to 11N) or another cache that is included in the memory sub-system 110. The cache eviction component 113 can replace the invalid data at the cache line with the retrieved valid data and can then perform the eviction operation of the cache line. Further details with regards to the operations of the operation interruption component 113 are described below.

Figure 2:
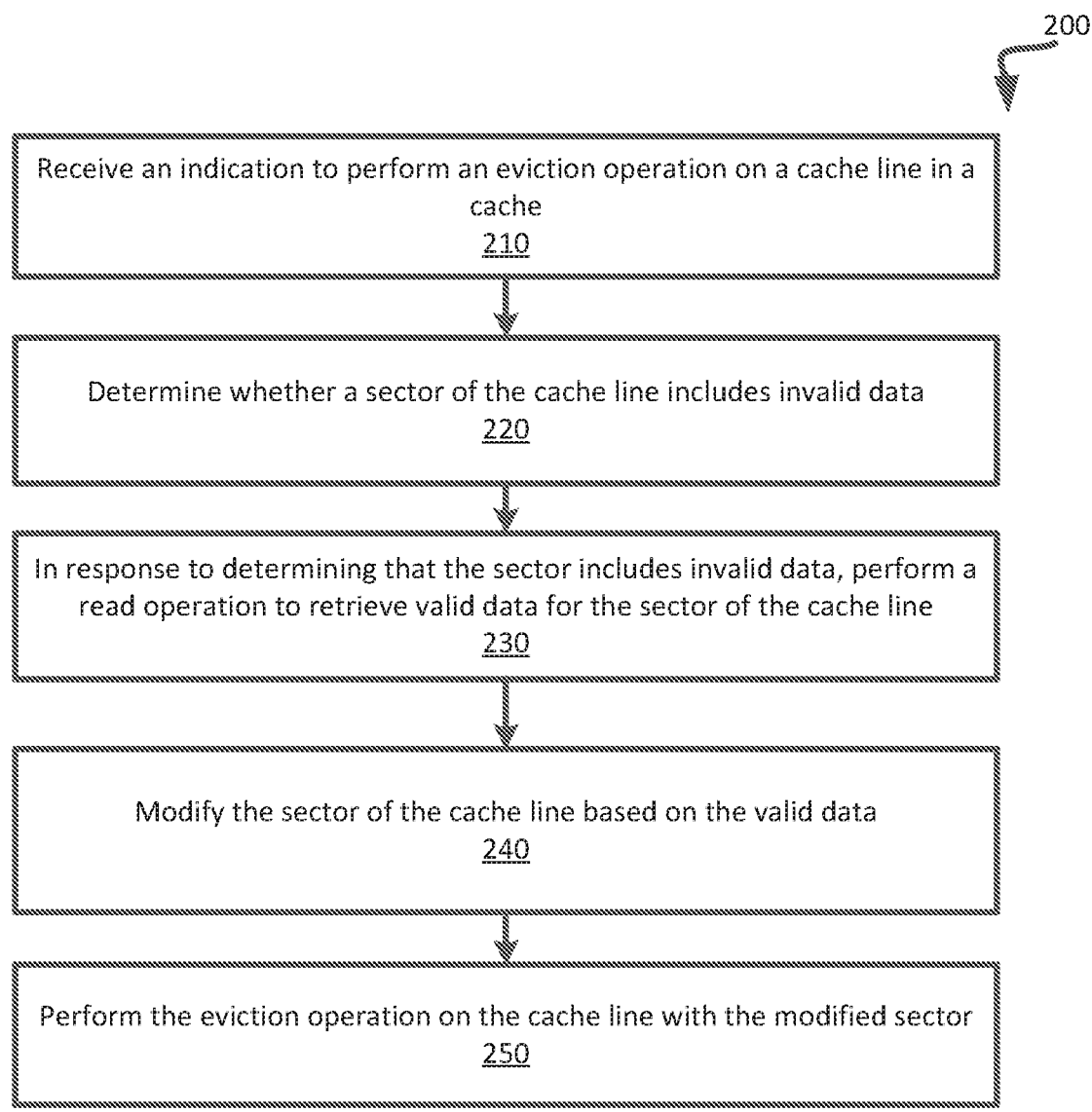
FIG. 2 is a flow diagram of an example method to perform an eviction operation in accordance with some embodiments.

FIG. 2 is a flow diagram of an example method 200 to perform an eviction operation in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the cache eviction component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives an indication to perform an eviction operation on a cache line in a cache. The indication can be received when a threshold number of cache lines have been stored at the cache. In some embodiments, the indication can be received when the threshold number of cache lines are stored at the cache and new data is to be stored at a cache line of the cache. The new data can be data of a recent write operation from a host system or data of a recent read operation from the host system. The cache line can be selected to be evicted based on a cache policy. For example, a least recently used policy can specify that the least recently used (i.e., accessed) cache line can be evicted when a cache line is to store new data. In some embodiments, the cache line can be selected based on a least frequently used policy that can specify that the least frequently accessed cache line over a period of time can be evicted when a cache line is to store new data.

At operation 220, the processing logic determines whether a sector of the cache line includes invalid data. In some embodiments, the memory sub-system can identify the invalid data based on a data structure that identifies data stored at the cache. For example, a content addressable memory (CAM) can include a data structure that identifies information of data currently stored at the cache. The information can specify a logical address for data and an indication of whether the data corresponding to the logical address is invalid or valid. For example, a bit value of the data structure for each entry can specify whether the corresponding data is valid or is invalid. Thus, the information in the CAM can specify whether a particular sector of the cache line includes valid data or invalid data. At operation 230, the processing logic performs a read operation to retrieve valid data for the sector of the cache line in response to determining that the sector includes invalid data. For example, the valid data can be data that has been provided by a write operation from the host system and for the same logical address as the invalid data. Thus, the invalid data can be considered older data associated with a prior read operation or write operation from the host system when compared with the valid data. The valid data can be retrieved from the backing store of the memory sub-system. For example, the valid data can be retrieved based on the logical address of the invalid data. In some embodiments, groups of data (e.g., multiple sectors) can be retrieved from the backing store and the portion of the retrieved data that is the valid data for the logical address can be selected to replace the invalid data. For example, data of multiple logical addresses can be retrieved from the backing store at a single time and the valid data for the logical address of the invalid data can be selected. In some embodiments, the valid data can be retrieved from another cache of the memory sub-system as further described in conjunction with FIG. 4.

At operation 240, the processing logic modifies the sector of the cache line based on the valid data. For example, a write operation can be performed on the cache line in the cache to replace the invalid data at the sector with the retrieved valid data. In some embodiments, the cache line can be retrieved from the cache and stored in a buffer and the write operation can be performed at the cache line by changing the invalid data stored at the buffer. Furthermore, at operation 250, the processing logic performs the eviction operation on the cache line with the modified sector. For example, the cache line can be evicted from the cache after the invalid data at the sector has been replaced with the valid data. Thus, the cache line can be evicted with all valid data and no invalid data. The eviction of the cache line can result in the data of the cache line being stored at the backing store of the memory sub-system.

Figure 3:
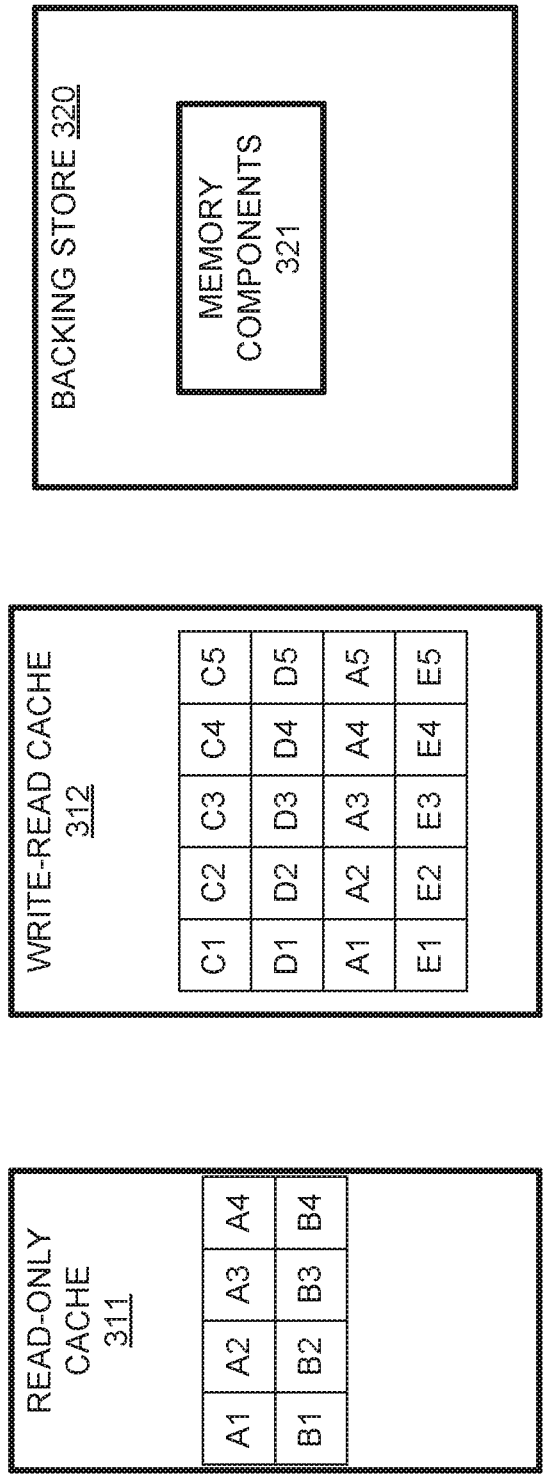
FIG. 3 illustrates the replacing of invalid data at a cache line that is to be evicted in accordance with some embodiments of the present disclosure.

FIG. 3 illustrates the replacing of invalid data at a cache line that is to be evicted in accordance with some embodiments of the present disclosure. The invalid data can be replaced by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the replacement of the invalid data is performed by the cache eviction component 113 of FIG. 1.

As shown in FIG. 3, a memory sub-system can include a read-only cache 311, a write-read cache 312, and a backing store 320. The write-read cache 312 can store data associated with read operations and write operations from a host system when the workload of the host system is random. For example, the write-read cache 312 can store data that has been received from the host system as part of a write operation to write data at memory components 321 of the backing store 320 and can store data that has been received from the memory components 321 of the backing store 320 in response to a read operation from the host system. The read-only cache can be a separate cache that is used to store data that has been received from the memory components 321 of the backing store 320 in response to read operations from the host system when the workload of the host system is sequential. Thus, data from read operations and write operations can be stored at the write-read cache 312 when the workload of the host system is of a first type (e.g., random) and data from read operations can be stored at the read-only cache 311 when the workload of the host system is of a different second type (e.g., sequential).

As previously described, an eviction operation can be performed on the write-read cache 312. For example, the third cache line can be evicted. As shown, the third cache line can include sectors with data A1, A2, A3, A4, and A5. The eviction of the third cache line can remove the data A1 through A5 so that subsequent data can be stored at the sectors of the cache line. Furthermore, the eviction of the third cache line can result in the data A1 through A5 being stored at the backing store 320. In some embodiments, the data A2 of the second sector in the third cache line can be considered invalid data. Before the third cache line is evicted, the data A2 can be replaced with corresponding valid data. For example, the data A2 can be data from a particular logical address. The valid data A2 can then be retrieved by using the same logical address when retrieving the valid data from the memory components 321 of the backing store 320. The retrieved valid data from the backing store 320 can be written to the second sector of the third cache line of the write-read cache 312 so that each sector of the third cache line stores valid data. Subsequently, the third cache line can be evicted from the write-read cache 312 and the data can be stored at the backing store 320.

In some embodiments, the read-only cache 311 can also store the valid data. For example, as shown, the read-only cache 311 can also store the valid data A2. As such, in some embodiments, the valid data from the read-only cache 311 can be written to the second sector of the write-read cache 312. After the valid data has been written to the write-read cache 312 to replace invalid data, the cache line can be evicted from the write-read cache 312. For example, the data at the sectors of the cache line can be removed and stored at the backing store 320.

Thus, a determination can be made as to whether another cache (e.g., the read-only cache) includes valid data that can be used to replace the invalid data at the write-read cache. If the read-only cache includes the valid data, then the valid data can be retrieved from the read-only cache so that the invalid data can be replaced at the write-read cache. Otherwise, if the read-only cache does not include the valid data, then the valid data can be retrieved from the backing store.

Figure 4:
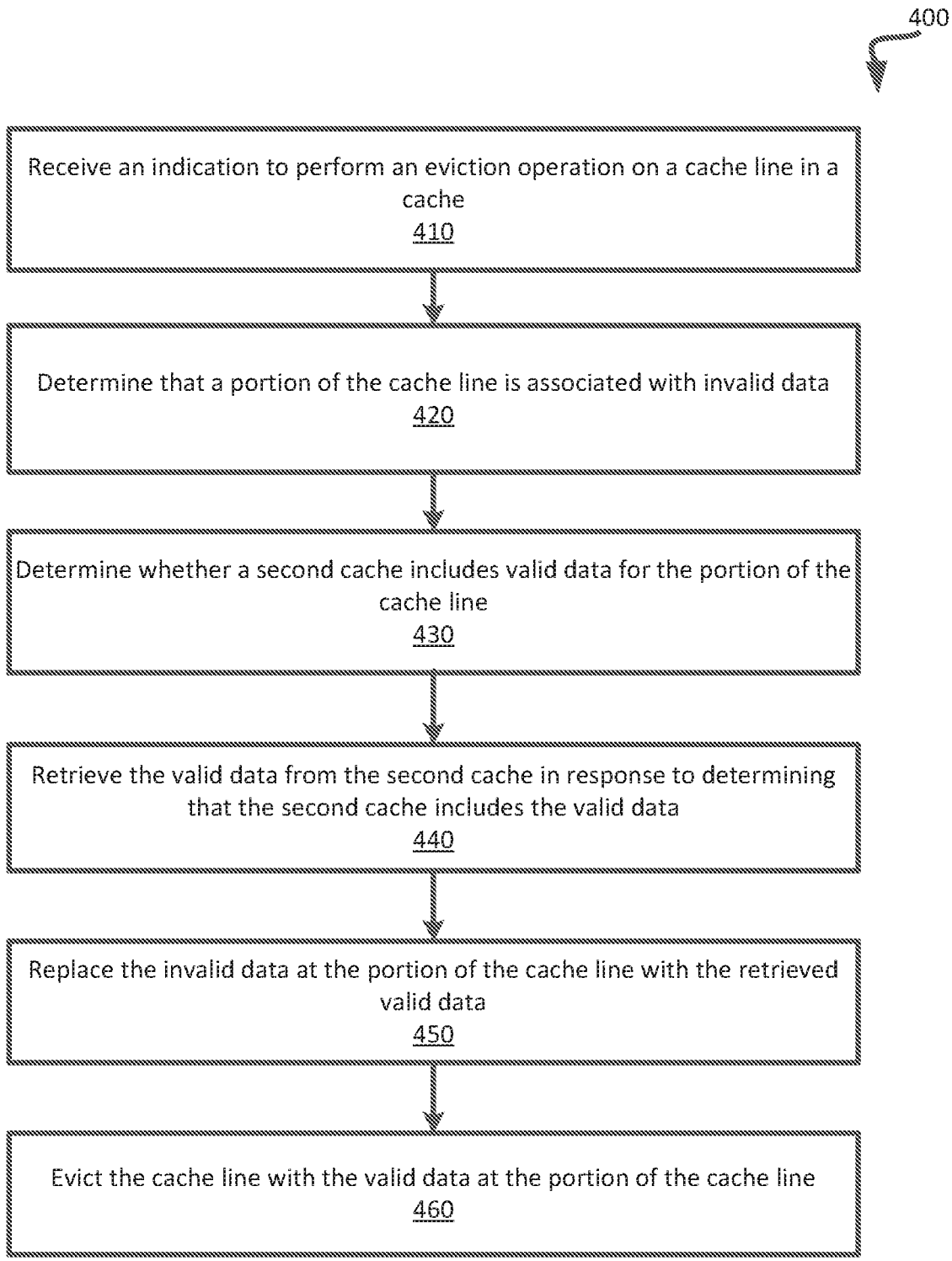
FIG. 4 is a flow diagram of an example method to modify a cache line in a cache based on valid data at another cache in accordance with some embodiments of the present disclosure.

FIG. 4 is a flow diagram of an example method 400 to modify a cache line in a cache based on valid data at another cache in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cache eviction component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic receives an indication to perform an eviction operation on a cache line in a cache. For example, a cache line of a write-read cache can be evicted when a threshold amount of cache lines in the write-read cache include valid data and new data is to be stored at a cache line of the write-read cache. Thus, the eviction operation can be performed when a threshold amount of cache lines of the write-read cache include at least some valid data and new data is to be stored at one or more of the cache lines of the write-read cache. At operation 420, the processing logic determines that a portion of the cache line is associated with invalid data. For example, a sector of the cache line can be identified as including invalid data as previously described. The invalid data can be data that is no longer current or used by the host system. At operation 430, the processing logic determines whether a second cache includes valid data for the portion of the cache line. For example, a read-only cache that is separate from the write-read cache can be checked to verify whether the valid data is present at the read-only cache. For example, as previously described, a CAM or other such data structure can be used to determine whether the second cache includes valid data for a logical address of the invalid data. Thus, in some embodiments, a content address memory of the read-only cache can be searched to determine whether the valid data is currently present at the read-only cache.

At operation 440, the processing logic retrieves the valid data from the second cache in response to determining that the second cache includes the valid data. For example, a read operation can be performed on the second cache to retrieve the cache line that includes the valid data. The valid data can then be selected or removed from the cache line. Furthermore, at operation 450, the processing logic replaces the invalid data at the portion of the cache line with the retrieved valid data. For example, a write operation can be performed on the cache to replace the invalid data with the valid data that has been retrieved from the second cache. Thus, the invalid data at a particular sector of the cache line can be replaced with the valid data from the second cache. Furthermore, at operation 460, the processing logic evicts the cache line with the valid data at the portion of the cache line. For example, the cache line can be evicted from the cache after the valid data has been written to the portion of the cache line that had included the invalid data. The eviction of the cache line can result in the data of the cache line being stored at the backing store of the memory sub-system.

Figure 5:
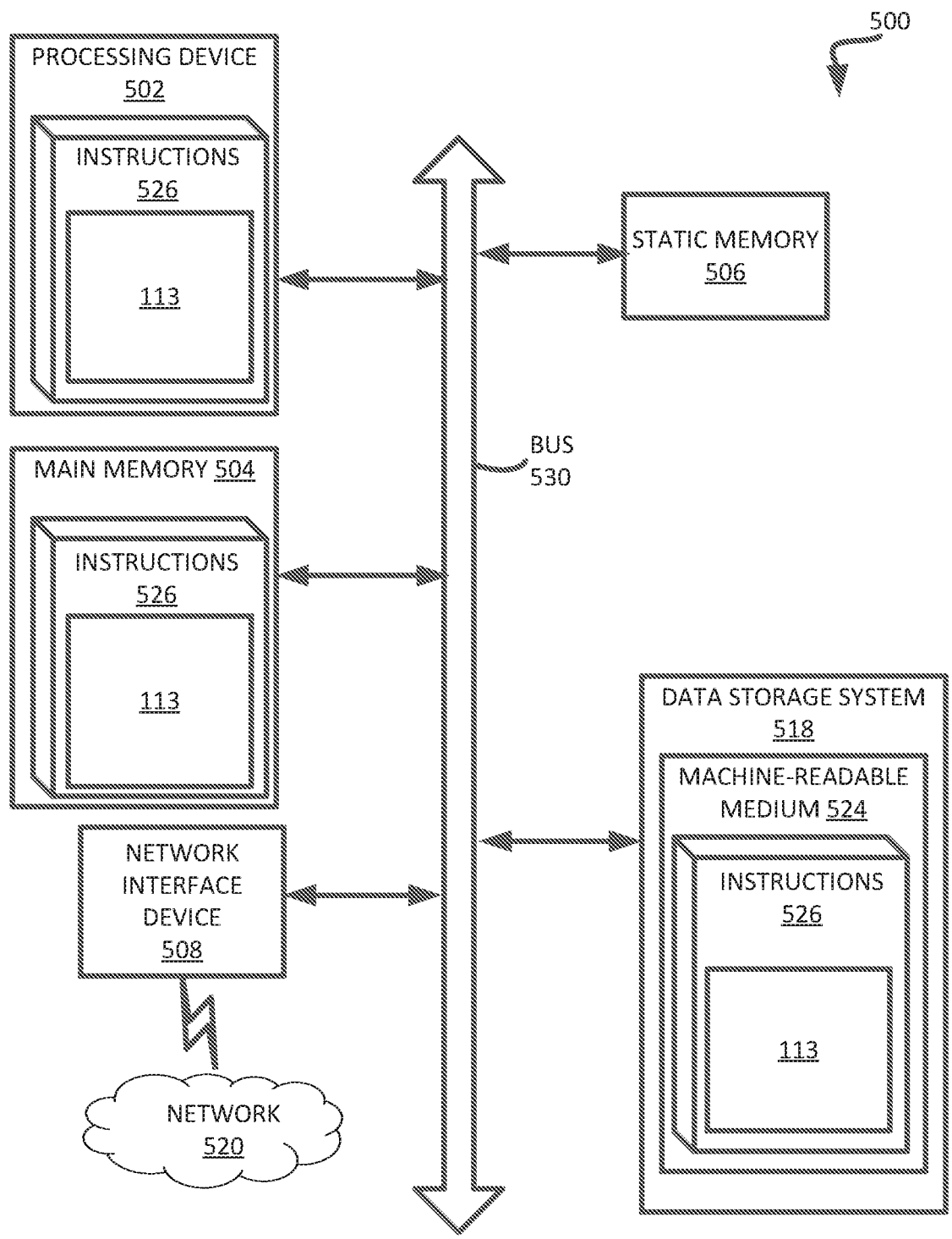
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a cache eviction component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a cache eviction component (e.g., the cache eviction component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving an indication to perform an eviction operation on a cache line in a cache;
   determining whether at least one sector of a plurality of sectors of the cache line to be evicted is associated with invalid data having an associated logical address;
   in response to determining that at least one sector of the plurality of sectors of the cache line to be evicted is associated with invalid data, performing, by a processing device, a read operation to retrieve, from a storage location outside the cache, valid data associated with the at least one sector and having a same logical address as the invalid data;
   modifying the at least one sector of the cache line to be evicted that is associated with the invalid data based on the valid data, wherein modifying the at least one sector comprises replacing the invalid data in the at least one sector of the cache line to be evicted with the retrieved valid data having the same logical address; and
   performing the eviction operation on the cache line with the modified at least one sector.

2. The method of claim 1, wherein the performing of the eviction operation on the cache line with the modified at least one sector corresponds to writing data of the plurality of sectors of the modified cache line to one or more memory components.

3. The method of claim 1, wherein the read operation is performed at one or more memory components, and wherein the eviction operation stores data of the cache line at the one or more memory components.

4. The method of claim 1, wherein performing the read operation to retrieve the valid data associated with the at least one sector comprises:
   determining that the valid data is stored in a second cache; and
   performing the read operation on the second cache to obtain the valid data for the at least one sector, and wherein the eviction operation stores data of the cache line at one or more memory components associated with a backing store.

5. The method of claim 1, wherein the cache line is selected from a plurality of cache lines in the cache.

6. The method of claim 5, wherein the cache line is selected based on the cache line being a least recently used cache line of the plurality of cache lines in the cache.

7. The method of claim 1, wherein each sector of the plurality of sectors of the cache line corresponds to data associated with one or more read operations or one or more write operations.

8. A system comprising:
   a memory component; and
   a processing device, operatively coupled with the memory component, to:
      receive an indication to perform an eviction operation on a cache line in a cache;
      determine that a portion of the cache line to be evicted is associated with invalid data having an associated logical address;
      in response to determining that the portion of the cache line to be evicted is associated with invalid data, determine whether a second cache includes valid data for the portion of the cache line that is associated with the invalid data and has a same logical address as the invalid data;
      retrieve the valid data from the second cache in response to determining that the second cache includes the valid data;
      replace the invalid data at the portion of the cache line to be evicted with the retrieved valid data having the same logical address; and
      perform the eviction operation on the cache line in the cache based on the retrieved valid data.

9. The system of claim 8, wherein the cache is a write-read cache and the second cache is a read-only cache.

10. The system of claim 9, wherein the write-read cache stores data from a host system in response to the host system being associated with a first workload, and wherein the read-only cache stores data from the host system in response to the host system being associated with a different second workload.

11. The system of claim 8, wherein the processing device is further to:
retrieve the valid data from a backing store in response to determining that the second cache does not include the valid data.

12. The system of claim 8, wherein
the eviction operation is performed on the cache line with the retrieved valid data that has replaced the invalid data.

13. The system of claim 8, wherein the cache line is selected from a plurality of cache lines based on the cache line being a least recently used cache line of the plurality of cache lines in the cache.

14. A non-transitory computer readable medium comprising instructions, which when executed by a processing device, cause the processing device to perform operations comprising:
receiving an indication to perform an eviction operation on a cache line in a cache;
determining whether at least one sector of a plurality of sectors of the cache line to be evicted is associated with invalid data having an associated logical address;
in response to determining that at least one sector of the plurality of sectors of the cache line to be evicted is associated with invalid data, performing a read operation to retrieve, from a storage location outside the cache, valid data associated with the at least one sector and having a same logical address as the invalid data;
modifying the at least one sector of the cache line to be evicted that is associated with the invalid data based on the valid data, wherein modifying the at least one sector comprises replacing the invalid data in the at least one sector of the cache line to be evicted with the retrieved valid data having the same logical address; and
performing the eviction operation on the cache line with the modified at least one sector.

15. The non-transitory computer readable medium of claim 14, wherein the performing of the eviction operation on the cache line with the modified at least one sector corresponds to writing data of the plurality of sectors of the modified cache line to one or more memory components.

16. The non-transitory computer readable medium of claim 14, wherein the read operation is performed at one or more memory components, and wherein the eviction operation stores data of the cache line at the one or more memory components.

17. The non-transitory computer readable medium of claim 14, wherein to perform the read operation to retrieve the valid data associated with the at least one sector, the operations further comprise:
determining that the valid data is stored in a second cache; and
performing the read operation on the second cache to obtain the valid data for the at least one sector, and wherein the eviction operation stores data of the cache line at one or more memory components associated with a backing store.

18. The non-transitory computer readable medium of claim 14, wherein the cache line is selected from a plurality of cache lines in the cache.

19. The non-transitory computer readable medium of claim 18, wherein the cache line is selected based on the cache line being a least recently used cache line of the plurality of cache lines in the cache.

20. The non-transitory computer readable medium of claim 14, wherein each sector of the plurality of sectors of the cache line corresponds to data associated with one or more read operations or one or more write operations.

* * * * *